United States Patent
Rath et al.

(10) Patent No.: US 9,188,468 B2
(45) Date of Patent: Nov. 17, 2015

(54) PORTABLE ULTRASONIC FLOW MEASURING SYSTEM HAVING A MEASURING DEVICE WITH ADJUSTABLE SENSOR HEADS RELATIVE TO EACH OTHER

(75) Inventors: Eric Rath, Veghel (NL); Walter Seybold, Traiskirchen-Oeynhausen (AT)

(73) Assignee: Hydeosonic B.V., Veghel (NL)

( * ) Notice: Subject to any disclaimer, the term of this patent is extended or adjusted under 35 U.S.C. 154(b) by 156 days.

(21) Appl. No.: 13/611,407

(22) Filed: Sep. 12, 2012

(65) Prior Publication Data
US 2013/0061687 A1 Mar. 14, 2013

(30) Foreign Application Priority Data
Sep. 12, 2011 (EP) .................................. 11007410

(51) Int. Cl.
*G01F 1/66* (2006.01)
*G01F 15/14* (2006.01)

(52) U.S. Cl.
CPC ................ *G01F 1/662* (2013.01); *G01F 15/14* (2013.01)

(58) Field of Classification Search
None
See application file for complete search history.

(56) References Cited

U.S. PATENT DOCUMENTS

| | | | | |
|---|---|---|---|---|
| 2,959,054 A * | 11/1960 | Welkowitz | ................. | 73/861.02 |
| 3,204,456 A * | 9/1965 | Welkowitz | ................. | 73/861.26 |
| 3,906,791 A * | 9/1975 | Lynnworth | ................. | 73/861.29 |
| 4,454,767 A * | 6/1984 | Shinkai et al. | ............. | 73/861.18 |
| 4,754,650 A * | 7/1988 | Smalling et al. | ............ | 73/861.28 |
| 5,179,862 A * | 1/1993 | Lynnworth | ................. | 73/861.28 |
| 5,369,998 A * | 12/1994 | Sowerby | ..................... | 73/861.04 |
| 5,437,194 A * | 8/1995 | Lynnworth | ................. | 73/861.27 |
| 5,440,937 A * | 8/1995 | Lynnworth et al. | ........ | 73/861.29 |
| 5,463,905 A * | 11/1995 | Baird | .......................... | 73/861.25 |
| 5,645,071 A * | 7/1997 | Harnoncourt et al. | ........ | 600/532 |
| 5,856,622 A * | 1/1999 | Yamamoto et al. | ........ | 73/861.28 |
| 6,058,786 A * | 5/2000 | Wallen et al. | .............. | 73/861.28 |
| 6,550,345 B1 * | 4/2003 | Letton | ........................ | 73/861.27 |
| 7,032,461 B2 * | 4/2006 | Ueki et al. | ................. | 73/861.22 |

(Continued)

FOREIGN PATENT DOCUMENTS

DE 10147175 A1 4/2003
DE 102006036720 A1 2/2008

(Continued)

OTHER PUBLICATIONS

European Search Report (EP 11 00 7410), dated Dec. 9, 2011.

*Primary Examiner* — Harshad R Patel
(74) *Attorney, Agent, or Firm* — Dinsmore & Shohl LLP

(57) ABSTRACT

The invention relates to a measuring device for a portable ultrasonic flow measuring system, which measuring device comprises two sensor heads. Each of the sensor heads comprises a sensor housing on which there is provided a sensing surface intended to be placed on or against a measuring tube. An ultrasonic transceiver is provided in each sensor housing for transmitting and receiving ultrasonic waves through the sensing surface. Additionally, the measuring device comprises a control and evaluation device for measuring a transit time difference for ascertaining the velocity of flow of a medium flowing through a measuring tube. Provision is made for each ultrasonic transceiver in the sensor head to be disposed therein parallel to the sensing surface in the sensor housing. The invention further relates to a measuring tube adapted for use with the measuring device of the invention and an information carrier that contains information concerning the measuring tube.

17 Claims, 10 Drawing Sheets

(56) References Cited

U.S. PATENT DOCUMENTS

| | | |
|---|---|---|
| 7,562,584 B2 * | 7/2009 | Conquergood ................. 73/861 |
| 7,617,739 B1 * | 11/2009 | Dam .......................... 73/861.27 |
| 2004/0173029 A1 * | 9/2004 | Osone et al. ................ 73/861.25 |
| 2007/0151362 A1 * | 7/2007 | Mori et al. ................. 73/861.27 |
| 2007/0151363 A1 * | 7/2007 | Ramsesh ..................... 73/861.27 |
| 2008/0236297 A1 | 10/2008 | Van Fleet et al. |

FOREIGN PATENT DOCUMENTS

| | | |
|---|---|---|
| DE | 102008033701 A1 | 1/2009 |
| EP | 1413858 A1 | 4/2004 |
| JP | S60259913 | 12/1985 |
| WO | 2005038410 A2 | 4/2005 |
| WO | 2009071960 A1 | 6/2009 |

* cited by examiner

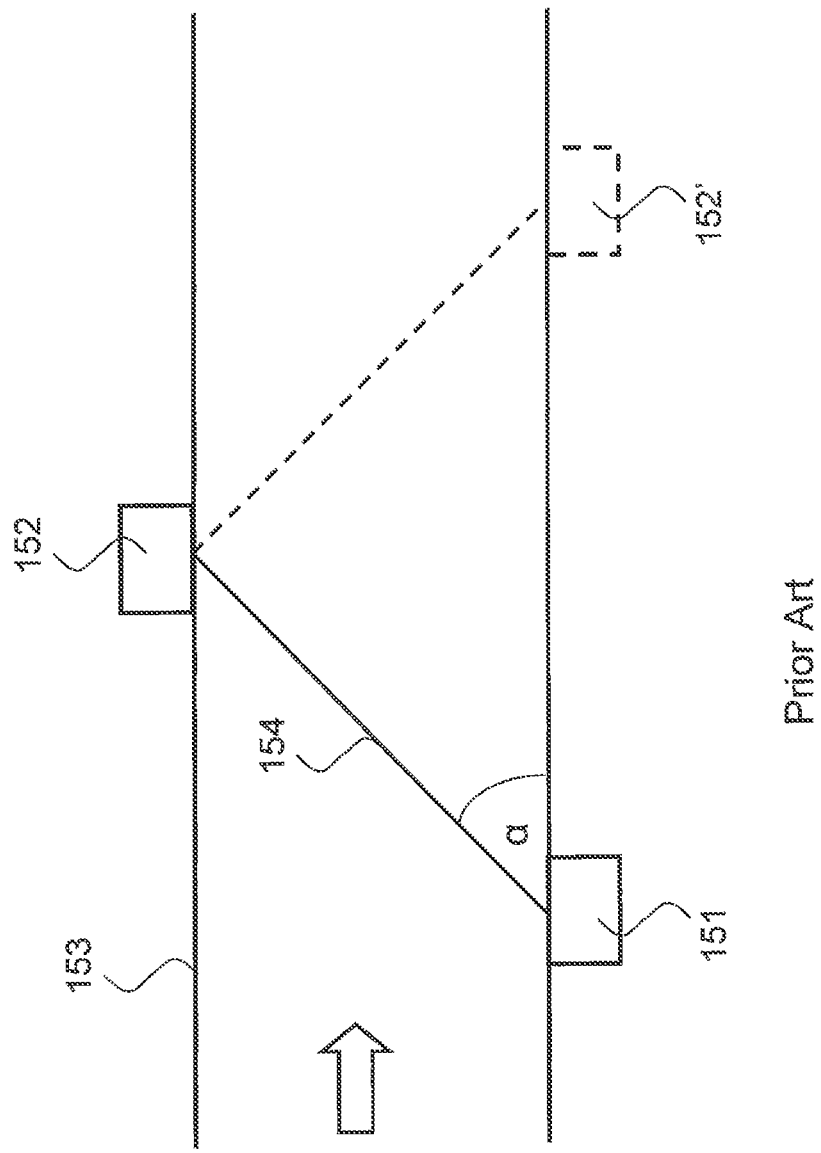

PORTABLE ULTRASONIC FLOW MEASURING SYSTEM HAVING A MEASURING DEVICE WITH ADJUSTABLE SENSOR HEADS RELATIVE TO EACH OTHER

BACKGROUND

1. Field

Embodiments of the present disclosure are directed to a portable ultrasonic flow measuring system.

2. Background

Various measuring methods are known for ascertaining the rate of flow through a tube. The invention relates to the ascertainment of the rate of flow by means of ultrasound. Such measuring systems are also referred to as ultrasonic flow measuring systems. Two methods are prevalent for ascertaining the rate of flow by means of ultrasound: the ultrasonic Doppler method that implements the Doppler Effect and the ultrasonic transit time method that ascertains differences in transit times of transmitted signals and, based on the same, ascertains the velocity of a fluid or medium flowing through a measuring tube. The invention relates to substantially ultrasonic flow measuring systems operating according to the ultrasonic transit time method.

The principle of the ultrasonic transit time method is explained below in greater detail with reference to FIG. 11. For execution of this measuring method, basically at least two ultrasonic transceivers 151, 152 are required, which are used for transmitting and receiving ultrasonic waves. The two ultrasonic transceivers 151 and 152 are attached to a measuring tube 153 such that one transceiver 151 is disposed slightly more downstream than the other. Ultrasonic signals are then transmitted by the first ultrasonic transceiver 151 to the second ultrasonic transceiver 152, and a transit time T1 is measured. Similarly, ultrasonic signals are transmitted by the second ultrasonic transceiver 152 to the first ultrasonic transceiver 151, and again a transit time T2 of the ultrasonic signal is measured. It is necessary for the two ultrasonic transceivers 151 and 152 to be appropriately aligned with each other.

The path of the sound between the two ultrasonic transceivers 151 and 152 is referred to as the signal path 154. An exact alignment of the two ultrasonic transceivers 151 and 152 with each other is important, since otherwise the transmitted signals cannot be received. It might also happen that the signal received is not the direct signal but one reflected by the wall of the measuring tube. This would falsify the measurement.

In FIG. 11, the direction of flow of the fluid flowing through the measuring tube is denoted by an arrow. When ultrasonic signals are now transmitted by the transceiver 151 to the transceiver 152, they move in the direction of flow. The ultrasonic signals transmitted by the transceiver 152 to the transceiver 151 move against the direction of flow. Due to the direction of flow, there is a time difference between the transit time of the ultrasonic waves in the direction of flow T1 and the transit time of the ultrasonic waves against the direction of flow T2. This difference in the transit times is dependent on the velocity of flow. Therefore, the velocity of flow of the medium can be determined by means of the equation $$v = \frac{(T_2 - T_1)}{T_1 T_2} \cdot \frac{L}{2\cos(\alpha)}$$

where v is the velocity of flow of the medium, T1 is the transit time of the ultrasonic signal in the direction of flow, T2 is the transit time of the ultrasonic signal against the direction of flow, L is the length of the ultrasonic signal path, and a is the angle of the ultrasonic signal to the direction of flow.

The volumetric rate of flow can be ascertained from the thus determined velocity of flow of the medium in the measuring tube and from the diameter or cross-sectional area of the measuring tube.

Apart from the direct sound path, as denoted by the solid line in FIG. 11, it is also possible to use a signal path reflected on the wall of the measuring tube or a signal path that includes the reflection thereof by the wall of the measuring tube. The reflected signal path is denoted by the dashed line in FIG. 11. In this case, the transceiver 152 would not be used, but rather, a transceiver 152' would be used in its place. The increased length of the measured distance results in fundamentally more accurate measured values.

However, due to the variables required for computing the velocity of flow such as the angle α and the length L of the ultrasonic signal path, it is important to detect the geometry of the measuring set-up with a high degree of accuracy. Also situations in which the number of reflections is not known should be avoided, since otherwise the length of the ultrasonic signal path would be misjudged.

Basically, two different types of ultrasonic flow measuring systems operating according to the transit time measuring system are known. The first of these consist of permanently installed systems. In these systems, the ultrasonic transceiver is located permanently on or in the measuring tube. This allows the transceivers to be geometrically arranged to a high degree of accuracy. However, the disadvantage of this system is that the sensors must basically remain in or on the tube and thus involve increased capital expenditure. Such systems are mostly used only when substantially continuous monitoring of the flow is required.

By contrast, so-called clamp-on flow meters are known in which ultrasonic sensor heads of an ultrasonic flow measuring system are attached to a measuring tube from outside. This measuring system can be dismantled on completion of the measurement and set up again at another measuring point. However, the disadvantage thereof is that the high requirements of accuracy concerning the geometrical orientation and the transmission of the ultrasonic signals call for a laborious process of installation and adjustment. In addition, the data measured by means of clamp-on devices are far less accurate than data provided by permanently installed systems.

A development of the measuring systems having permanently installed sensors is disclosed in DE 10 2008 033 701 A1. In this case, a special measuring tube is provided, to which an ultrasonic measuring device can be fixed mechanically. The system described in this citation is employed particularly in fields in which continuous measurement is necessary. The advantages of this system are that it is not necessary to remove the complete tube for the purpose of calibrating the measuring system, as is the case in permanently installed measuring sensors, but rather, it is possible to remove only the ultrasonic measuring device. However, in order to ensure that only one specific ultrasonic measuring device can be positioned on a specific measuring tube so as to effect calibration of the tube, additional mechanical identification elements are provided.

However, the ensuing disadvantage is that the ultrasonic measuring device can only be used on this measuring tube, and there is no possibility of flexible use thereof as in the case of clamp-on measuring devices.

US 2008/0236297 A1 describes an ultrasonic measuring device for examining blood vessels. The ultrasonic device comprises a measuring head comprising ultrasonic transceivers that form a measuring path through a central open region of the measuring head, where the blood vessel being examined is fixed in position by means of an inner sleeve attached to an interior surface of the measuring head.

WO 2009/071960 A1 discloses a device for ascertaining the velocity of flow in a tube by means of ultrasound. This is achieved by placing an ultrasonic transmitter on the measuring tube so as to oppose two ultrasonic receivers. Either the transmitter emits wide-angle radiation or it comprises two obliquely disposed transmitters for transmitting ultrasonic waves to the two receivers.

DE 2006 036 720 A1 describes a tube comprising an information carrier that is capable of recording and storing information.

SUMMARY

It is an object of the invention to provide a portable ultrasonic flow measuring system that can be flexibly implemented and that comprises a measuring device and a measuring tube and provides highly accurate measurements and ease of handling.

This object is achieved, according to the invention, by a measuring device having the features described herein.

The invention relates to a measuring device for a portable ultrasonic flow measuring system, which measuring device comprises two sensor heads. Each of the sensor heads comprises a sensor housing on which there is provided a sensing surface. This sensing surface is intended to be placed on or against a measuring tube. Furthermore, an ultrasonic transceiver is provided in each sensor housing for transmitting and receiving ultrasonic waves via the sensing surface. Additionally, the measuring device comprises a control and evaluation device for measuring a transit time difference for the purpose of ascertaining the velocity of flow of a medium flowing through a measuring tube.

The invention further relates to a measuring tube for a portable ultrasonic flow measuring system for use with a measuring device comprising two sensor heads that are movable relatively to each other. The measuring tube comprises a long, straight tube element having a tubular external surface. Additionally, tube-connecting elements are provided at both ends of the measuring tube.

Additional preferred embodiments are specified in the dependent claims, the description, and the figures and the description thereof.

Provision is made for each ultrasonic transceiver to be disposed in the sensor head such that it is substantially parallel to the sensing surface in the sensor housing.

A basic concept of the invention resides in the realization that it is possible to depart from an oblique arrangement of the ultrasonic transceivers in the sensor head in order to achieve a wider range of application. Traditionally, ultrasonic transceivers are provided in the sensor head such that they are inclined relatively to the sensing surface.

The ultrasonic transceivers are inclined relatively to the sensing surface in order to make it possible to couple or irradiate the ultrasonic waves obliquely into the measuring tube and into the medium flowing therethrough. This already defines the signal path. However, the disadvantage of an oblique arrangement of the ultrasonic transceivers relative to the sensing surface in the sensor head is that the range of application is limited, since the signal path is already more or less fixed. As a result, flexible implementation of the sensor heads on different measuring tubes is possible only with difficulty or with great effort. As a result of the arrangement of the ultrasonic transceivers in the sensor head, as proposed by the invention, such that they are substantially parallel to the sensing surface in the sensor housing, it is possible to adjust the angle of incidence of the ultrasonic wave as required. This can be achieved, for example, by means of appropriate wedges or the like.

Basically, it should be noted that when mention is made of the angle of incidence and the transmission of ultrasonic waves within the scope of the invention, this can also include the reception of, or the angle of reception of, ultrasonic waves.

In a preferred embodiment, the sensor heads are configured so as to be movable relatively to each other. This provides a wide freedom of choice regarding their use on different measuring tubes, since there are no, or hardly any, restrictions on positioning the sensor heads, due to the movability of the sensor heads. In this case, it is possible for the sensor heads to be connected to a main unit comprising the control and evaluation device, for example by means of cables.

However, it is also possible to provide a base body and to attach the sensor heads thereto in a particularly flexible manner. In this case, the base body can be of any desired design, but it is advantageous for the sensor heads to be located at the ends of the base body so as to be located at a maximum distance from each other and thus capable of being placed satisfactorily against measuring tubes of various sizes.

The base body can principally be of any desired shape. However, it is advantageous when it has the form of scissors, forceps, a clamp, or a vise and when it is provided with one sensor head each on two of its end regions. As a result of a shape resembling scissors or forceps, it is easy to attach the sensor heads securely to a tube of any diameter. When the shape of the base body resembles scissors or forceps, it is also possible to ascertain additional information such as the distance of the sensor heads from each other by way of sensors in the base body. Similar advantages are achieved when a base body shaped as a clamp or a vise is attached to a measuring tube. There is in this way the assurance, in particular, that the sensor heads have sufficiently satisfactory contact with the measuring tube.

In a development of the base body, the sensor heads can be pivotally mounted on the base body. As a result, the sensor heads can be attached substantially at right angles to the contact devices, irrespective of the exact shape of the measuring tube, more particularly the shape of the contact devices. This results in a satisfactory input and output coupling behavior of the ultrasonic waves with no interfering signals, or at least with a reduction of interfering signals.

Additionally or alternatively, it is possible to provide the base body and the sensor heads attached thereto at a fixed distance from each other. In this case, the sensor heads can be only pivotally attached to the base body such that it is possible to position the sensor heads satisfactorily on a measuring tube.

However, it is advantageous when the distance of the sensor heads from each other can be varied. In this case, provision may also be additionally made for the base body to comprise means for ascertaining the distance of the sensor heads from each other. But this is not absolutely necessary. By virtue of the fact that the distance of the sensor heads from each other can be varied, it is possible to use the measuring device on measuring tubes of various diameters and with various signal paths, for example I-shaped, V-shaped, N-shaped, or W-shaped paths. This results in a wider range of application than in the case a measuring device comprising sensor heads disposed at a fixed distance from each other.

The base body can comprise a locking device for setting the distance of the sensor heads from each other. This offers the advantage that, when use is made of a measuring device comprising sensor heads, of which the intervening distance varies or can be varied and this measuring device is placed on a measuring tube, the distance of the sensor heads from each other is set by the locking device so that the sensor heads can be removed from the measuring tube only with difficulty, or not at all, during the measuring process.

In a further embodiment of the measuring device, provision is made for a readout device for automatically, or at least semi-automatically, reading an information carrier attached to a measuring tube. In this case, the control and evaluation device may optionally implement at least part of the information read out for the purpose of ascertaining the rate of flow of the medium flowing through the measuring tube. The information carrier may include variations of information concerning the measuring tube and/or the geometry of the measuring set-up, for example information concerning the material of the tube, the positioning of the contact devices of the measuring tube relative to each other, the angle of the contact devices relative to the center axis of the measuring tube, equivalent to the angle α mentioned above, the temperature of the measuring tube, the serial number of the measuring tube, and/or the specified signal path.

When at least one or more pieces of said information are implemented by the control and evaluation device for computing the velocity of flow, there is a more accurate result when ascertaining the velocity of flow. For example, it is possible to provide the information carrier in the form of an RFID tag. In this case, the reading device is in the form of an RFID reader that reads the information contained in the information carrier. However, it is alternatively possible to provide merely a serial number on the information carrier. In this case, there will be provided a database in the control and evaluation device, by means of which at least part of the information required for ascertaining the velocity of flow can be obtained on the basis of a specific serial number. It is also conceivable for the measuring device to scan an external database via a mobile data network access to a LAN or the Internet.

If positioning devices are provided in the region of the sensing surfaces to complement positioning aids provided on a measuring tube and together with the positioning aids allow for secure seating of the sensor heads, it is possible to achieve greater positioning accuracy of the sensor heads on a measuring tube. For this purpose, dovetail grooves, centering holes or counterbores, screw-threaded bores or magnets and any other suitable tight- and/or force-fit connection device may be provided.

The measuring tube of the invention is characterized in that two contact devices are provided each of which defines one contact position for a sensor head of a measuring device, and an information carrier comprising information concerning the measuring tube and/or the defined contact positions is attached on or to the measuring tube.

The invention is based on the realization that in conventional clamp-on measuring systems adapted for use on any desired measuring tubes, it is extremely laborious to carry out an accurate measurement. In order to achieve reliable measured values in these systems, it is necessary to adjust them in a precise and time-consuming manner. According to the invention, such time-consuming adjustment can be dispensed with, since two contact devices are provided each for defining one contact position for a sensor head of an appropriate measuring device. These contact devices define the exact positions of the two sensor heads on the measuring tube. Thus it is no longer necessary to determine the positions of the sensor heads experimentally as in the case of known clamp-on systems. Thus the positions of the contact devices define a signal path that is I-shaped or V-shaped, for example. In order for an appropriate measuring device to obtain this information, for example concerning the type of signal path, an information carrier is provided on the measuring tube. This information carrier provides the measuring device with information concerning the measuring tube and/or the specified contact positions. In this way, the measuring device can implement this information for the purpose of achieving a more accurate result in the flow measurement.

It is advantageous when each of the contact devices comprises a substantially flat surface on the tubular shell of the measuring tube, and when each of the flat surfaces is designed so as to be inclined relatively to the center axis of the measuring tube, such that the two flat surfaces of the two contact devices define a signal path for an ultrasonic signal. For example, the signal path can be in the form of an I-shaped, V-shaped, N-shaped or W-shaped signal path. Due to the inclination of the flat surfaces relative to the center axis of the measuring tube, it is possible to use sensor heads comprising ultrasonic transceivers that emit ultrasonic waves at right angles to the end of the sensor head. Thus the inclination of the surfaces in relation to the center axis defines the corresponding angle of incidence of the ultrasonic waves into the measuring tube. As a result, most of the essential information and/or parameters are defined by the contact device and the measuring tube. Thus the angle at which the ultrasonic wave is coupled into the measuring tube and the type of signal path of the ultrasonic signal are known from the measuring tube or from the information carrier. As a result, it is possible to carry out an accurate measurement without requiring prior tedious calibration or adjustment of the measuring sensors, since there exist in this case ideal measuring conditions including a known, previously defined signal path, of which all important parameters are known.

In a development of the measuring tube of the invention, the information carrier is in the form of an RFID tag and/or an electronic memory module and comprises, for example, information concerning the tube material, the positioning of the contact devices in relation to each other, the angle of the contact devices in relation to the center axis of the measuring tube, the temperature of the measuring tube, the serial number of the measuring tube and/or the specified signal path. With the aid of this information, a measuring device that reads the information carrier can increase the accuracy of the data ascertained or it can carry out a reliable measurement.

For example, if an RFID tag is used as the information carrier, it is also possible for the temperature of the measuring tube to be ascertained and read out by the measuring device via the RFID tag. Thus it is possible to allow for small deviations in the findings that are caused by temperature fluctuations. However, it is also possible to provide some other wireless or wired transmission of information from the information carrier of the measuring tube to the measuring device. Likewise, an electric direct transmission or a capacitive transmission can be used. In this case, it is also possible for simply a serial number or identification mark such as a model specification to be encoded on or in the information carrier. With the aid of the serial number, the measuring device can determine the necessary information from a database for computing the velocity of flow and the rate of flow.

In the region of the contact devices, positioning aids may be provided for ensuring a secure seating of sensor heads on the contact devices. They can more particularly serve to ensure a temporary force- and/or tight-fit connection between said elements. These positioning aids are preferably adapted so as to complement corresponding positioning devices on the sensor heads. For example, they can have a conical indentation, while the sensor heads comprise a matching conical protrusion. Other positioning aids are also possible such as, for example, dovetail grooves, centering holes or counterbores, screw-threaded holes or magnets and suitable recesses comprising guideways. The aim of the positioning aids is to achieve a secure seating of the sensor heads on the contact devices such that the information contained in the information carrier confirms to reality.

In principle, it is sufficient to simply place a sensor head on the contact device in order to couple an ultrasonic signal into the measuring tube. However, it is preferred for coupling elements to be provided in the region of the contact device that enable ultrasonic signals to be satisfactorily coupled into or out of the measuring tube. For example, they can be in the form of coupling pads or coatings, by means of which the coupling of sound into the liquid and out of the same are improved. In this respect, it is preferred that the differences between sound conductivity in the transceiver and in the measuring tube are matched continuously with the aid of the coupling elements so that unwanted sound reflections can be reduced.

The measuring tube of the invention can be used together with a measuring device of the invention as a portable ultrasonic flow measuring system.

In this case, provision may be made, for example, to install the measuring tube of the invention on devices that require temporary and not permanent monitoring of the flow. If such a monitoring procedure is required, the flow can be determined relatively easily and accurately by means of a measuring device of the invention. It is advantageous in such cases when the flow can be ascertained by means of the same measuring device used on different devices, each of which has a measuring tube installed therein, so that only one measuring device has to be purchased, for example in a plant comprising several of such devices that require temporary measurements of the flow. For the purpose of carrying out the measurement, it is only necessary for the sensor heads of a measuring device of the invention to be attached, for example, clamped, to a measuring tube in order to carry out an ultrasonic flow measurement and thus determine the rate of flow.

Furthermore, the interaction between the measuring tube of the invention and the measuring device of the invention makes it possible to achieve very accurate measurement of the rate of flow such as is not, or only hardly, possible in the case of conventional clamp-on measuring systems. Thus possible applications arise where conventional clamp-on systems cannot be used. For example, with hydraulic systems used in excavators, it is necessary to examine the performance capacity of a hydraulic system in use by ascertaining the hydraulic volumetric rate of flow at regular intervals.

In such a case, in order to carry out this measurement by means of known high-precision measuring devices, it is necessary to switch off the hydraulic system, disconnect the pipes of the hydraulic system, and safely collect the fluids in the pipes. It is then possible to install a high-precision fluid sensor, re-activate the hydraulic system, and deaerate the hydraulic system. The hydraulic volumetric rate of flow is then measured. On completion of the measurement, the pipes are again disconnected, the fluids are safely collected, the flow tube comprising the flow sensor is removed, and the pipes are reconnected. The hydraulic system must then be switched on again and, finally, deaerated.

This procedure can be simplified by using the portable ultrasonic flow measuring system of the invention. A measuring tube of the invention is installed in the hydraulic system at the factory at the time of production. Thereafter it is possible to merely place the measuring device of the invention on the measuring tube of the invention, to carry out the measurement, and then to remove the measuring device. In this way the measurement of the hydraulic volumetric rate of flow is accelerated considerably.

To summarize, the use of the portable ultrasonic flow measuring system of the invention makes it possible to carry out such a measurement without any risk, for example, of the soil becoming contaminated by a leakage of the hydraulic oil. There is also no necessity to enter data into the sensor in the ultrasonic flow measuring system of the invention, since the measuring device can automatically read out the geometry of the measuring tube and other parameters from the information carrier.

Apart from ascertaining the volumetric rate of flow, the ultrasonic signals that are transmitted and received can also be implemented for the detection of bubbles in the fluid and/or for ascertaining the concentration and/or density of the fluid. It is likewise possible, in addition to the use of the transit time measuring method, to measure the velocity of flow by the Doppler method and to compare the values obtained in order to verify the results. By this means, erroneous measurements yielding incorrect results, for example due to a defective sensor, are readily detected.

BRIEF DESCRIPTION OF THE DRAWINGS

The invention is explained below in greater detail with reference to exemplary embodiments and diagrammatic figures, in which:

FIG. 11 is a sketch illustrating the method for measuring the transit time difference.

DETAILED DESCRIPTION

Figure 1:
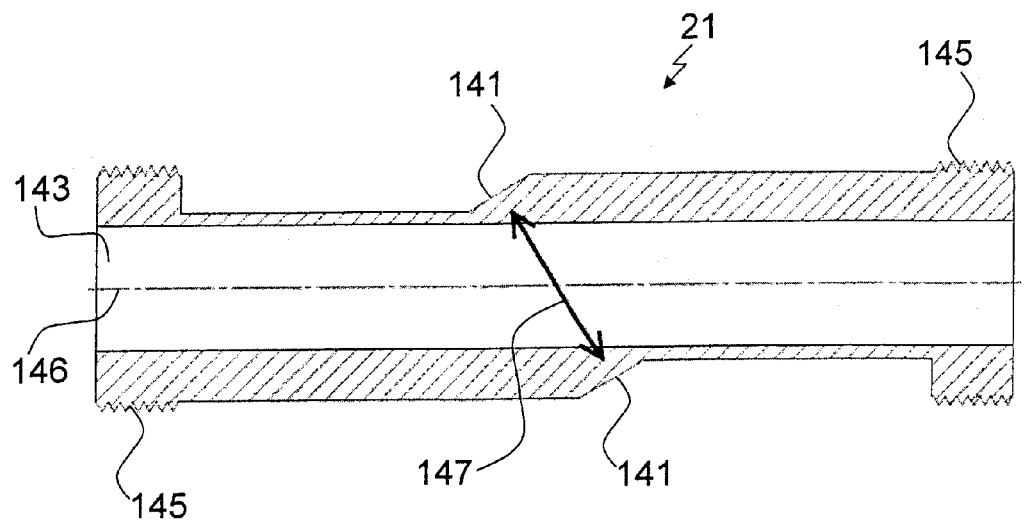
FIG. 1 shows a measuring tube of the invention with an I-shaped signal path.

FIG. 1 shows a first embodiment of a measuring tube 21 of the invention with an I-shaped signal path 147. In this embodiment, two mutually opposing contact devices 141 are provided on a straight tube element 143. The two mutually opposing contact devices are inclined relatively to a center axis 146 of the measuring tube 21. The measuring tube 21 can be flange-connected at both ends to other tube elements by means of tube connecting devices or screw threads 145.

The two contact devices 141 define the positions at which sensor heads of a measuring device can be placed. As a result of the sensor heads being designed as proposed by the invention such that the ultrasonic transceivers are aligned parallel to the sensing surface in the sensor head, a signal path 147 can be defined by the slant of the contact devices 141 relative to the center axis 146 of the measuring tube 21.

The contact devices 141 can be produced by removing material from the tubular shell of the measuring tube 21 by milling. For example, the contact devices 141 may be in the form of negative shapes of the sensor heads. They might likewise be in the form of flat, round, or arbitrarily shaped surfaces, to which the corresponding sensor heads are then matched.

It is of vital importance in this respect that a signal path 147 be defined by the geometry of the contact devices 141. Information concerning this signal path 147, for example the angle of the signal path 147 relative to the center axis 146 of the measuring tube 21, is then provided by an information carrier (not shown in the figure) provided on the measuring tube 21. The measuring device can then obtain information concerning the signal path 147 with the aid of this information carrier. These pieces of information are required to ascertain the velocity of the medium flowing through the measuring tube 21. The rate of flow of the medium can be determined from its velocity and the diameter of the measuring tube. For this purpose, it is also necessary that the diameter of the measuring tube be known to the measuring device. The information concerning the diameter of the measuring tube can likewise be stored in the information carrier.

Figure 2:
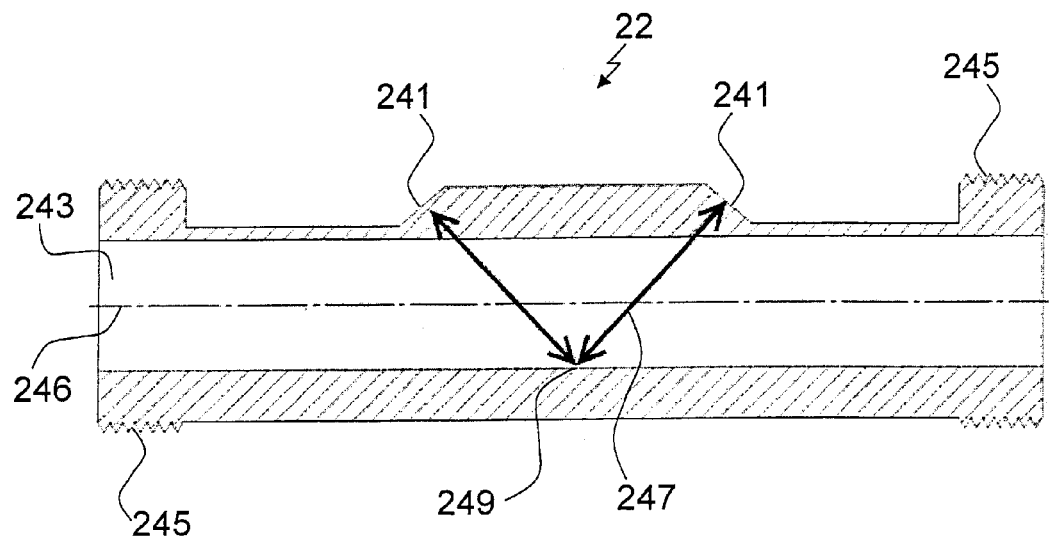
FIG. 2 shows a measuring tube of the invention with a V-shaped signal path.

FIG. 2 shows a further embodiment of a measuring tube 22. In this measuring tube 22, the two contact devices 241 define a V-shaped signal path 247. The ultrasonic signal coupled into the measuring tube 22 in the region of a first contact device 241 is reflected by the wall of the measuring tube such that it can be registered or received at the position of the second contact device 241. In order to improve this reflection, an ultrasonic reflector 249 may be provided at the appropriate location where the ultrasonic signal is to be reflected.

The contact devices 241 are in turn inclined in relation to the center axis 246 of the measuring tube 22. They differ from the contact devices 141 shown in FIG. 1 in that the contact devices 241 are provided in the tubular shell of the measuring tube 22 such that they are this time at a different angle to the center axis 246 of the measuring tube 22.

The measuring tube 22, substantially composed of a modified straight tube element 243, again comprises threads 245 at its ends in order to allow for installation thereof in, for example, a hydraulic system.

In the illustrations shown in the two FIGS. 1 and 2 an I-shaped signal path 147 or a V-shaped signal path 247 is shown, respectively. Depending on the arrangement of the contact devices 141, 241, the signal path can alternatively be N-shaped or W-shaped.

In principle, the measuring tube 21, 22 can have an arbitrary internal contour. Preferably, the internal contour has a streamlined shape and can have, for example, an inlet guiding cone. The measuring tube may also be provided with internal contours designed to prevent the formation of bubbles and the like and to achieve as uniform a rate of flow of the fluid medium as possible.

Figure 3A:
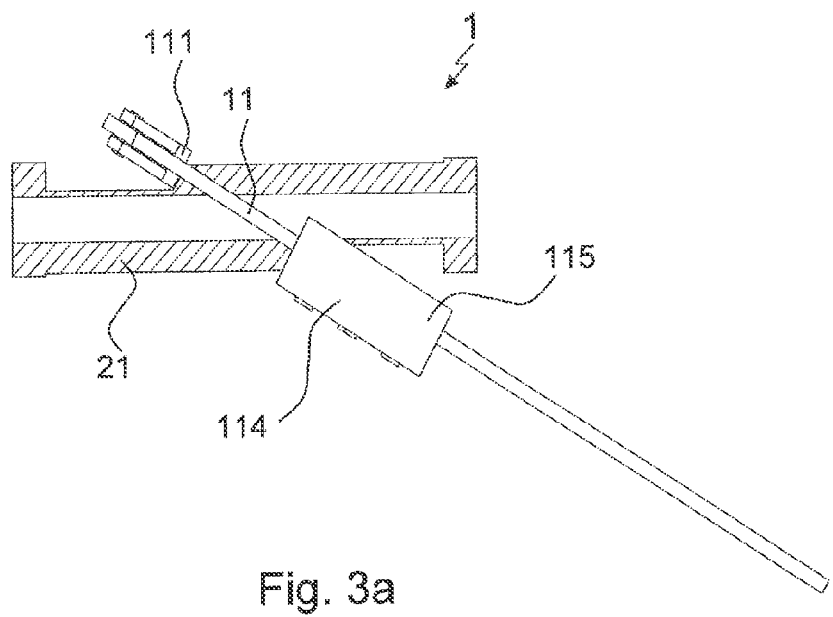
FIGS. 3a and 3b show a first embodiment of a measuring device of the invention on a measuring tube as shown in FIG. 1.
Figure 3B:
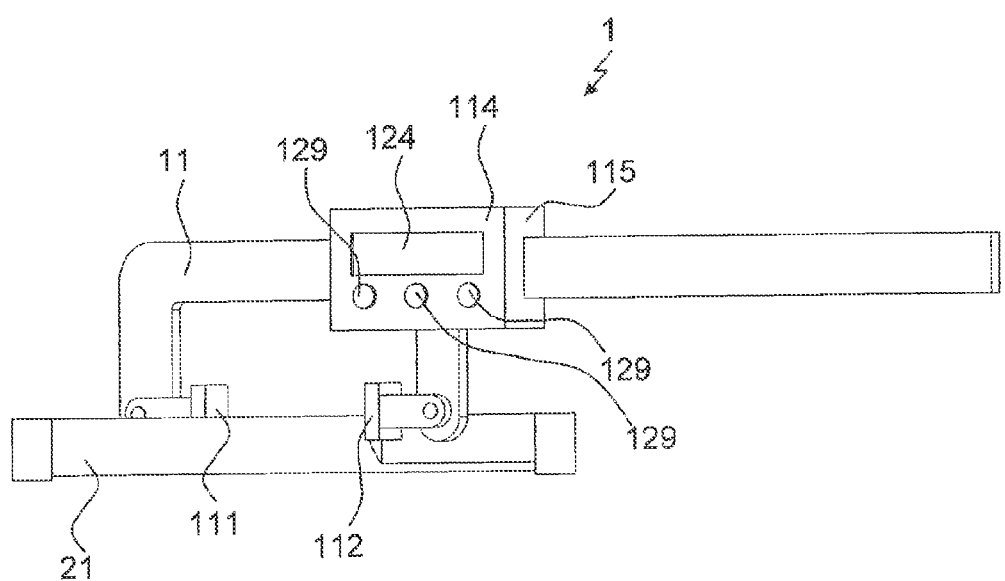

FIGS. 3a and 3b show an ultrasonic flow measuring system 1. It comprises a measuring device 11 and a measuring tube 21, which corresponds to the measuring tube 21 shown in FIG. 1.

Figure 4A:
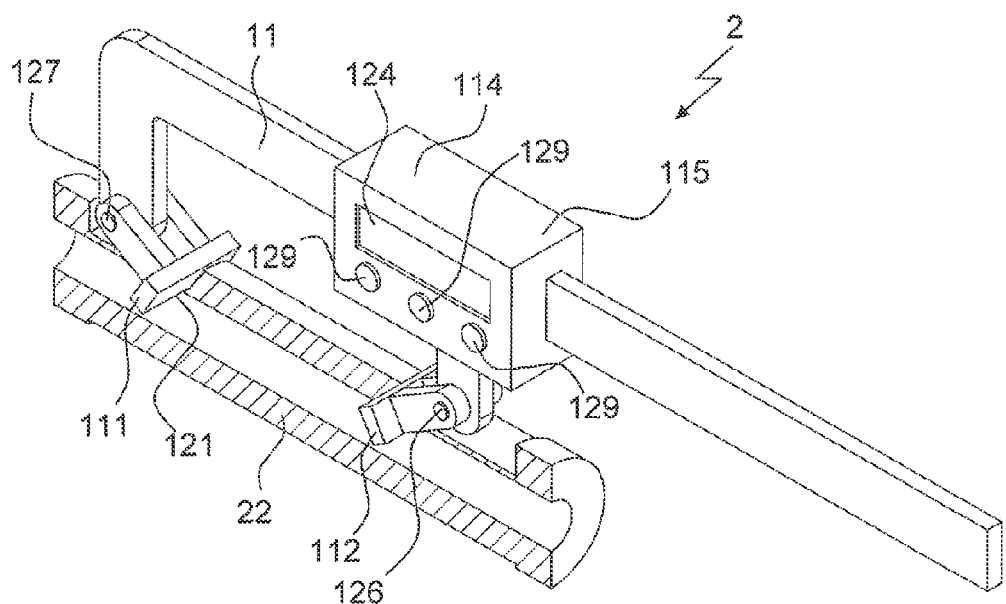
FIGS. 4a and 4b show a first embodiment of a measuring device of the invention on a measuring tube as shown in FIG. 2.
Figure 4B:
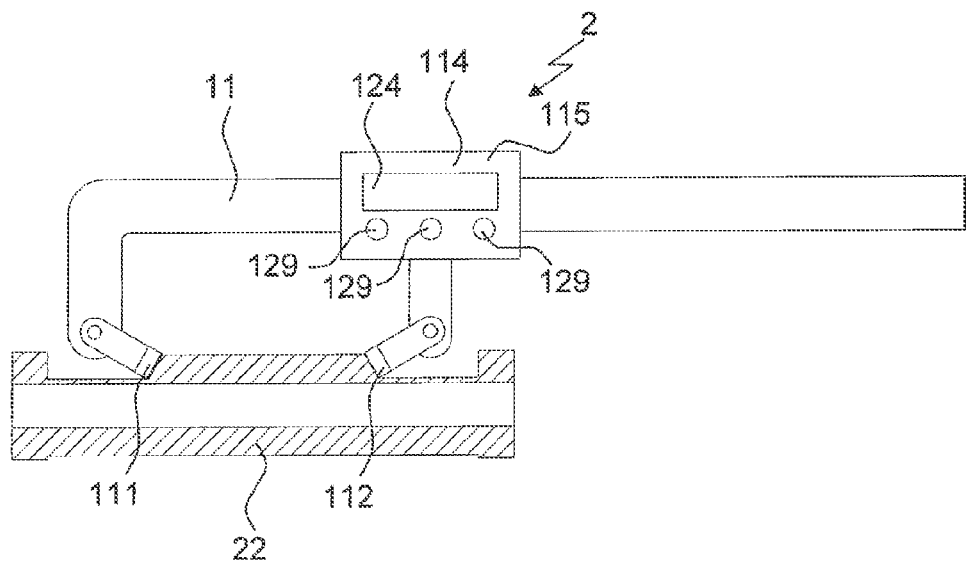

FIGS. 4a and 4b show a further embodiment of the ultrasonic flow measuring system 2 of the invention. The same measuring device 11 is used here as the one shown in FIGS. 3a and 3b. In this case, the measuring device 11 is used together with a measuring tube 22, which is the same as the measuring tube shown in FIG. 2. Reference numerals provided in FIGS. 4a and 4b that are also provided in FIGS. 3a and 3b refer to the same elements in each drawing.

The measuring device 11 has a shape similar to a sliding caliper, in which two sensor heads 111 and 112 are attached to a base body 114.

A basic unit 115 comprising an indicating device 124 that can also be referred to as a display device is provided on the base body 114. Appropriate operator controls in the form of control knobs 129 are also provided at this location. The basic unit 115 of the base body 114 can be moved on an arm of the base body 114 so that the distance of the two sensor heads 111 and 112 from each other can be varied. This serves to align the sensor heads 111, 112 precisely with the contact devices 141 of the measuring tube 21.

The measuring device 11 can ascertain the distance of the sensor heads 111 and 112 from each other. To this end, for example, a suitable distance-measuring device may be provided in the base body 114. However, it is also possible for a readout device to read the distance between the contact devices 141 of the measuring tube 21 from the information carrier, as a result of which the distance of the two sensor heads 111, 112 from each other will be known. When the measuring device 11 is placed against the measuring tube 21 as shown in the two FIGS. 3a and 3b, it is possible to carry out ultrasonic measurement to ascertain the velocity of flow of the medium in the measuring tube 21. Computation implementing the known geometry of the entire measuring set-up and the diameter of the measuring tube 21, will then allow the rate of flow to be ascertained and outputted to, for example, the display device 124.

The same measuring device 11 is used in FIGS. 4a and 4b. In this case, it is placed against a measuring tube 22 corresponding to the one shown in FIG. 2. In order to make it possible to use the measuring device 11 both on a measuring tube as shown in FIG. 1 and on a measuring tube shown in FIG. 2, the sensor heads 111 and 112 are pivotally attached to the base body 114 by means of hinges 126, 127. As a result of this articulated attachment, the sensor heads can be placed against contact devices 141, 241 that are at different angles relative to the center axis of the measuring tube 21, 22. Consequently, it is possible to use one and the same measuring device 11 on different measuring tubes 21, 22. This results in a wide range of applications for the measuring device 11, which is rather expensive in relation to the measuring tubes 21, 22, since it contains the electronic measuring equipment.

Figure 5A:
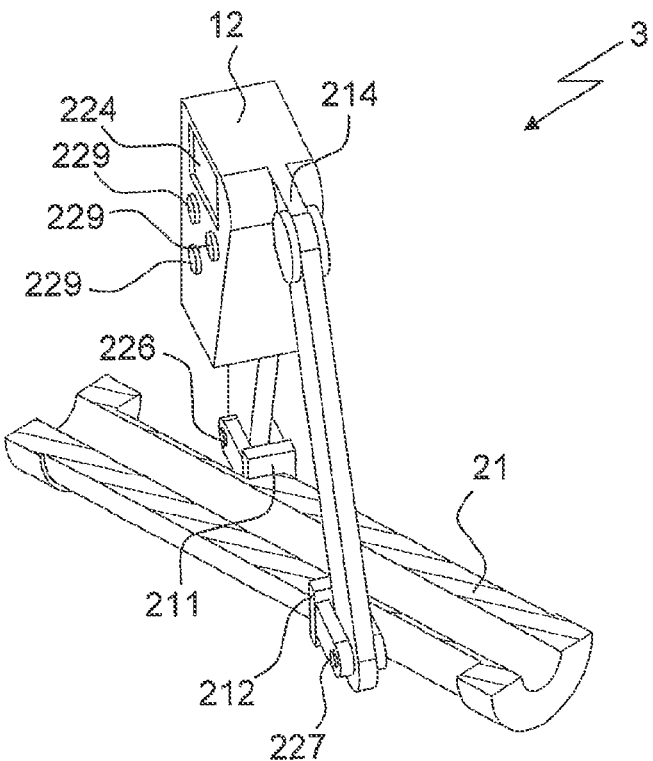
FIGS. 5a and 5b show a second embodiment of a measuring device of the invention on a measuring tube as shown in FIG. 1.
Figure 5B:
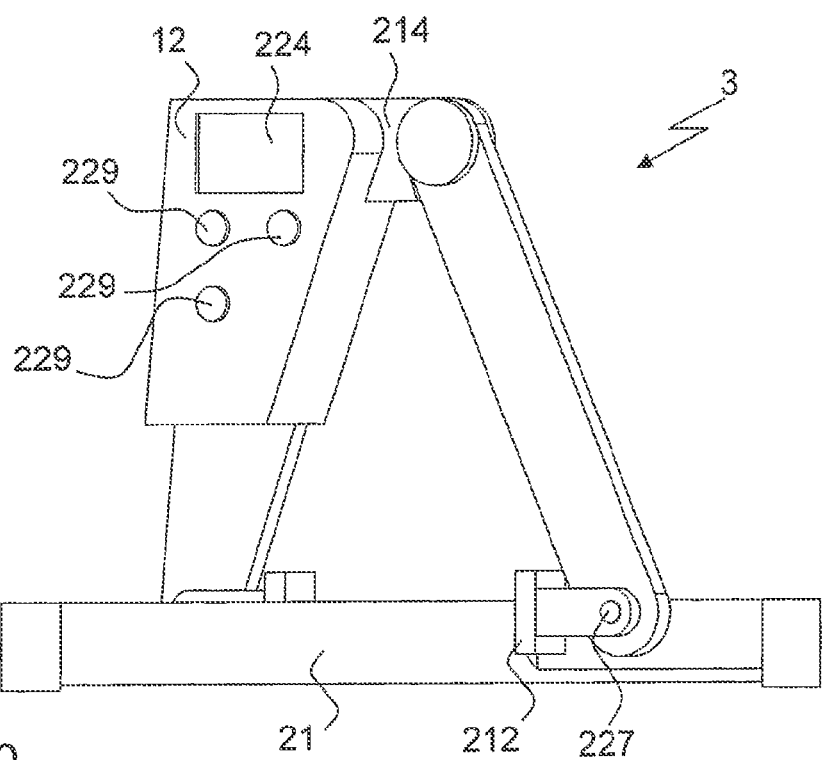
Figure 6A:
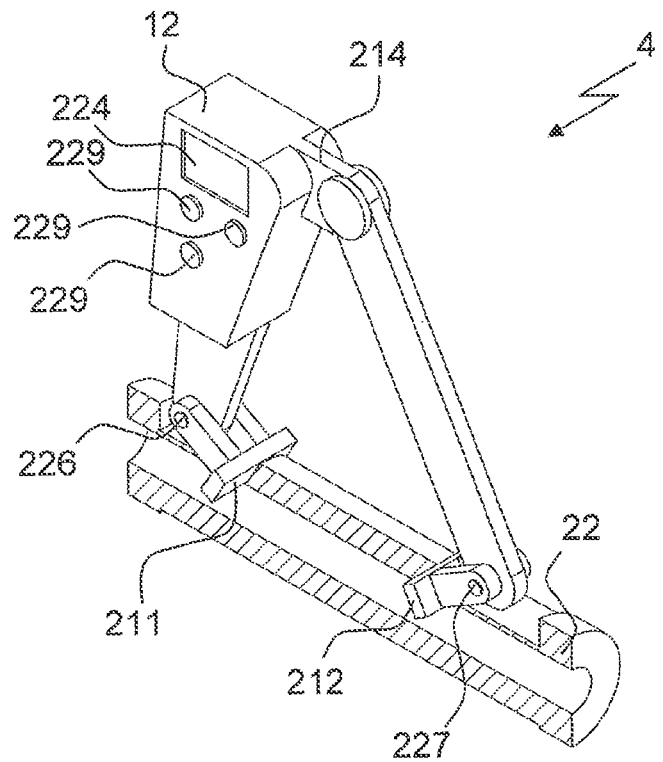
FIGS. 6a and 6b show a second embodiment of a measuring device of the invention on a measuring tube as shown in FIG. 2.
Figure 6B:
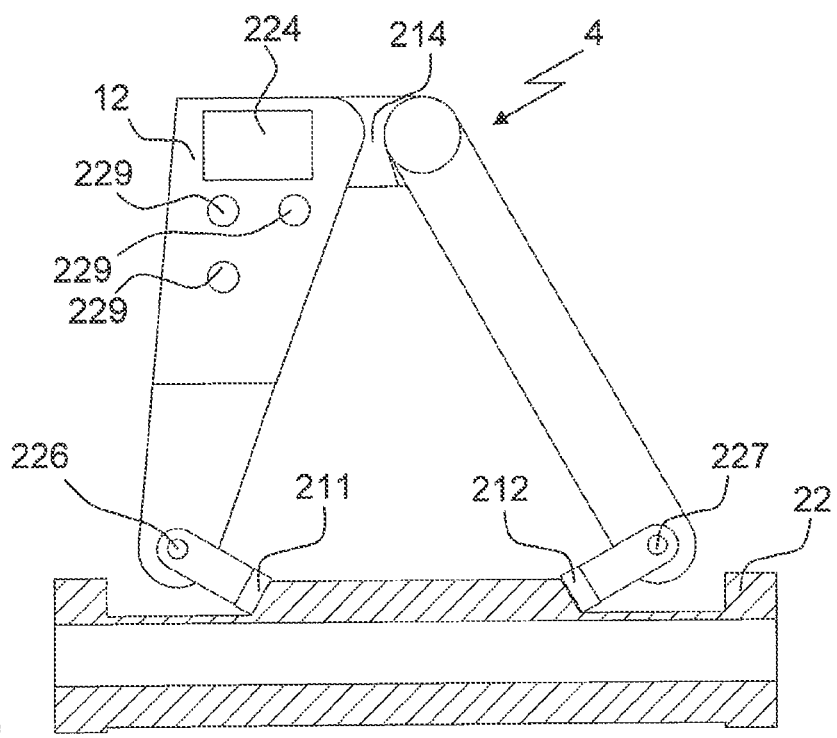
Figure 7A:
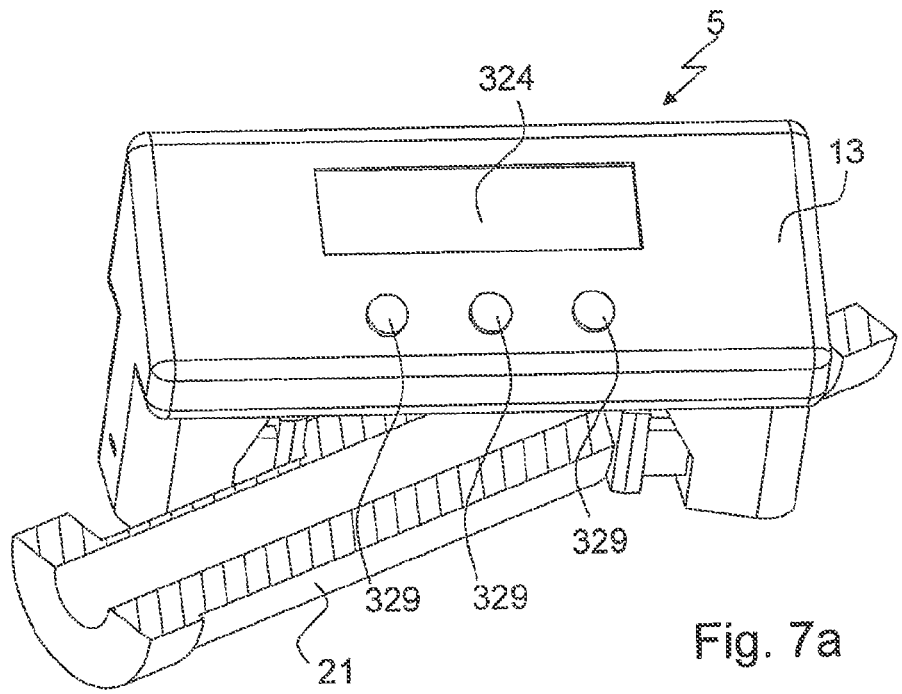
FIGS. 7a and 7b show a third embodiment of a measuring device of the invention on a measuring tube as shown in FIG. 1.
Figure 7B:
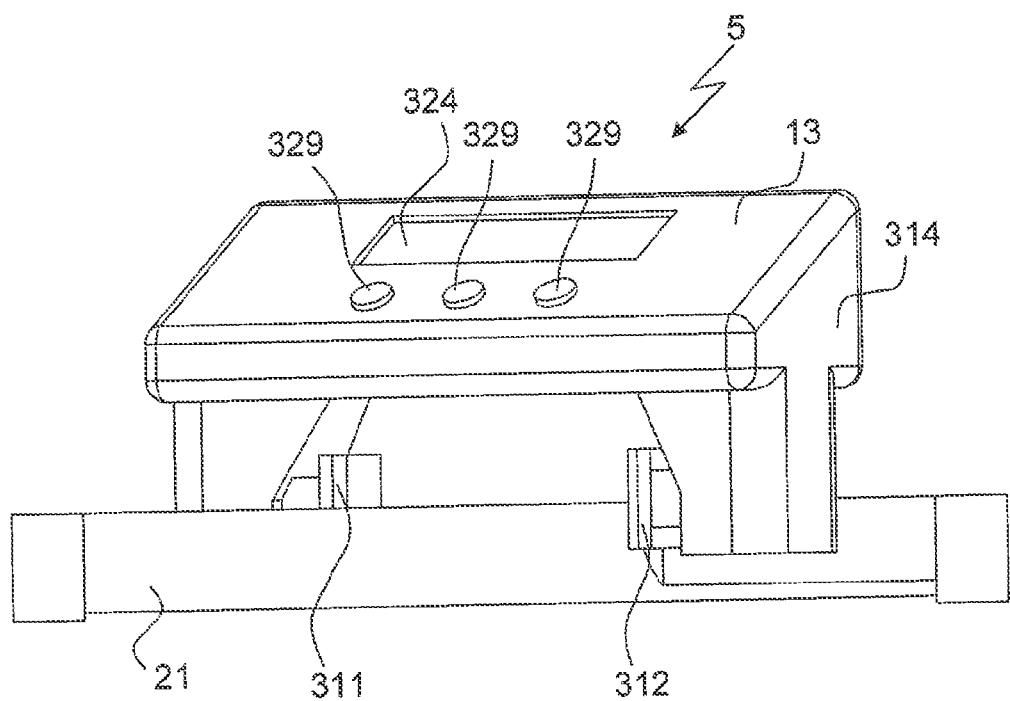

FIGS. 5a, 5b, 6a, and 6b show two further embodiments of an ultrasonic flow measuring system 3 and 4, respectively, of the invention. This measuring system 3, 4 operates using the same measuring device 12. The measuring device 12 can be placed against a measuring tube 21 as is shown in FIGS. 5a and 5b, and also against a measuring tube 22 as is shown in FIGS. 6a and 6b.

The measuring device 12 has a scissor-like shape. Two sensor heads 211, 212 are again attached to a base body 214 of the measuring device 12 by means of hinges 226 and 227. Again, the measuring device 12 comprises an indicating device 224 and operator controls 229. In this case, the distance of the sensor heads 211, 212 from each other can be determined, for example, by means of the opening angle of the base body 214. However, it is also possible, as mentioned above, to ascertain the distance of the sensor heads 211 and 212 from each other by way of the geometry of the contact devices 141, 241 of the measuring tube 21, 22 respectively. The geometry can be read out by the measuring device 12, for example, by means of an RFID readout device, when an appropriate RFID tag comprising the relevant information is provided on the measuring tube 21, 22. This RFID tag can also be used, for example, for the purpose of determining the current temperature of the measuring tube 21, 22. By allowing for the temperature, which has a small impact on the ultrasonic velocity, it is possible to achieve an even more precise measurement.

Figure 8A:
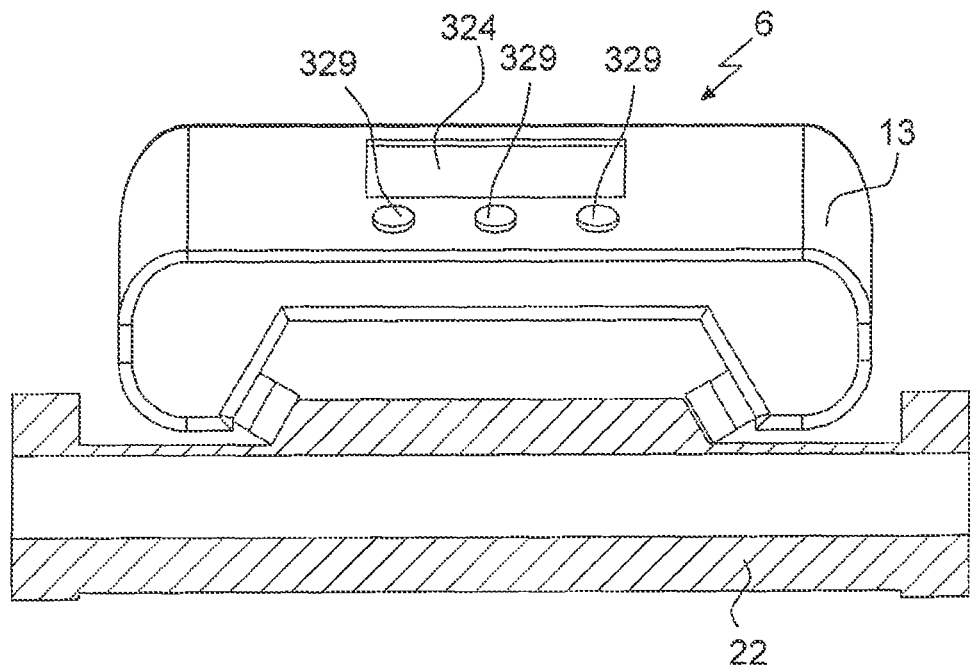
FIGS. 8a and 8b show a third embodiment of a measuring device of the invention on a measuring tube as shown in FIG. 2.
Figure 8B:
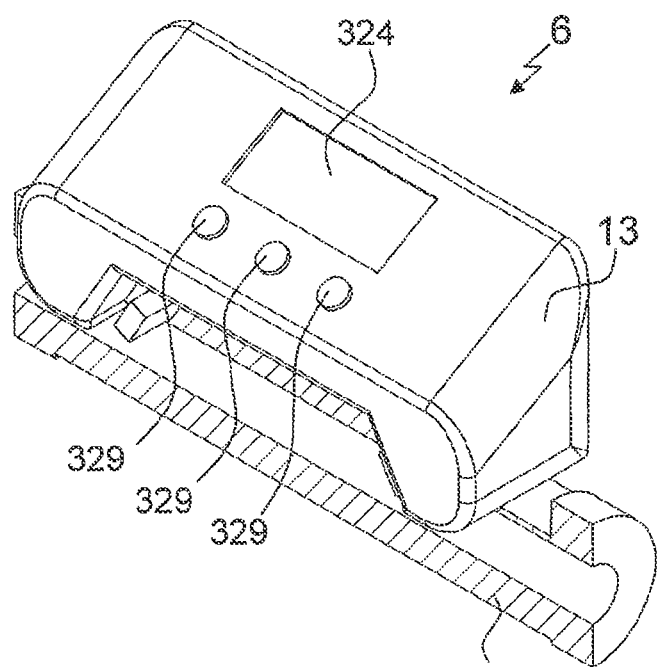
Figure 9A:
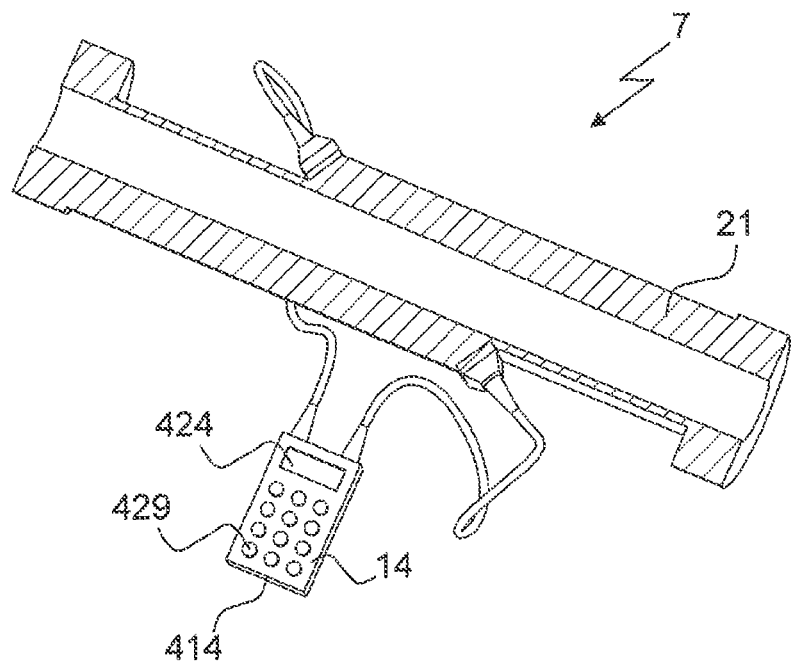
FIGS. 9a and 9b show a fourth embodiment of a measuring device of the invention on a measuring tube as shown in FIG. 1.
Figure 9B:
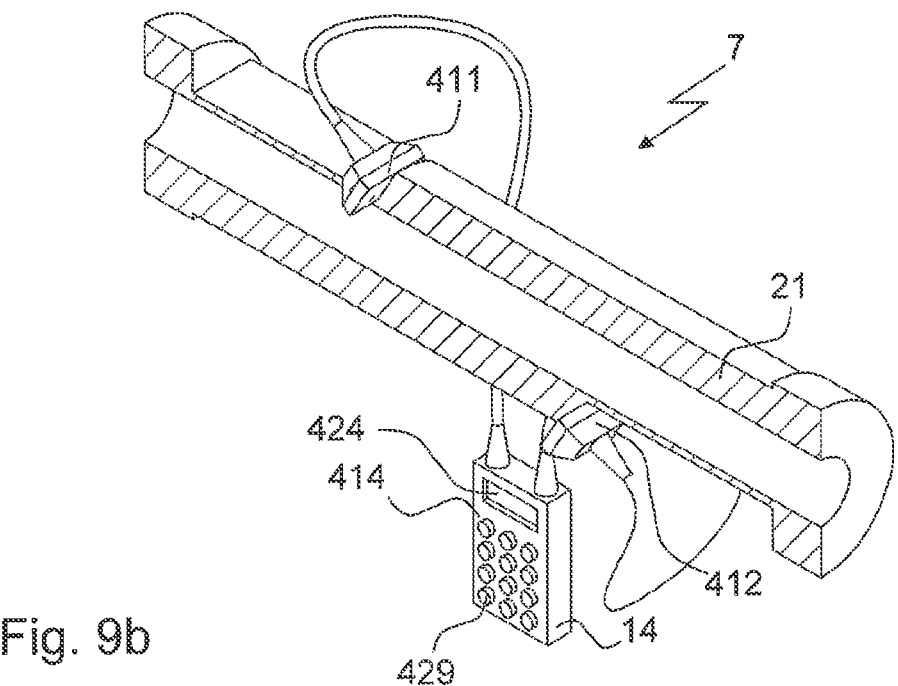
Figure 10A:
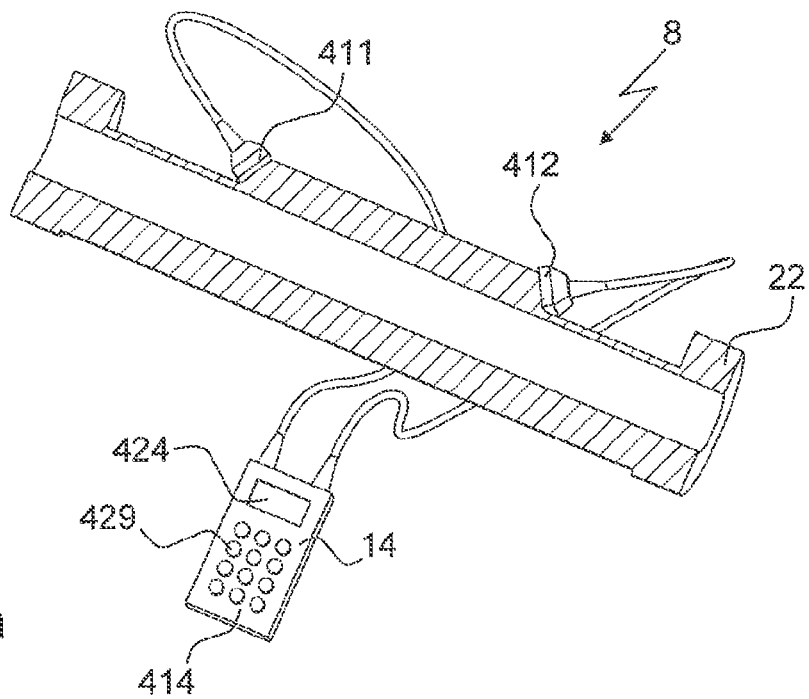
FIGS. 10a and 10b show a fourth embodiment of a measuring device of the invention on a measuring tube as shown in FIG. 2.
Figure 10B:
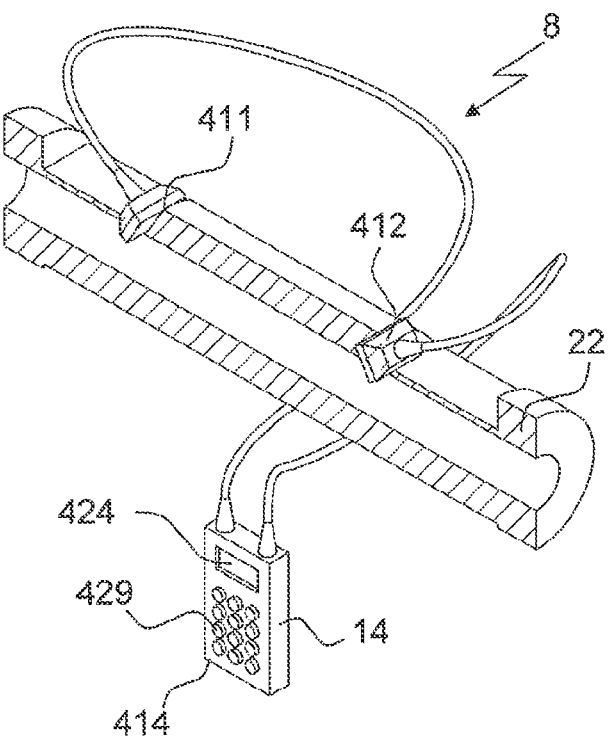

FIGS. 7a, 7b, 8a, and 8b show two further embodiments of the ultrasonic flow measuring system 5, 6, respectively, of the invention. This system 5, 6 operates using a measuring device 13. This measuring device 13 is used on the measuring tube 21 in the embodiment shown in FIGS. 7a and 7b, while the use of the measuring device 13 on the measuring tube 22 is illustrated in FIGS. 8a and 8b.

In this embodiment, the measuring device 13 mainly comprises the base body 314, on which an indicating device 324 and operator controls 329 are provided. Unlike the measuring devices 11, 12 described above, the distance of the sensor heads 311, 312 from each other in the measuring device 13 cannot be altered. However, they are likewise articulated to the base body 314 so that they can be matched to different geometries of the contact devices 141, 241 of the measuring tubes 21, 22.

FIGS. 9a, 9b, 10a, and 10b show two further embodiments of an ultrasonic flow measuring system 7, 8, respectively, of the invention. Use is again made of a measuring device 14 in all four Figures.

In this measuring device 14, the sensor heads 411, 412 are connected to the base body 414 by means of cable connectors. This provides great flexibility of application. However, the distance of the sensor heads 411, 412 from each other during measurement cannot be ascertained directly when use is made of this measuring device 14. Therefore, the use of this embodiment necessitates the provision of an information carrier on the measuring tube 21, 22 that contains information concerning the distance of the contact devices 141, 241 from each other. The measuring device 14 must include an appropriate reading device for the purpose of reading the information contained in the information carrier so that information concerning the distance of the two sensor heads 411, 412 from each other is available to make it possible to execute computation of the rate of flow through the measuring tube 21, 22.

However, it is not absolutely necessary for the measuring device 14 to read this information directly from the information carrier disposed on any one of the measuring tubes 21, 22. Alternatively, for example, the information carrier may be provided on the measuring tube 21, 22 in the form of a serial or model number. This number can then be entered by means of operator controls 429 provided on the base body 414 of the measuring device 14. By means of the serial number thus entered and a database provided in the memory of the base body 414, it is then possible to ascertain the relevant information concerning the measuring tube 21, 22 to make it available for computing the rate of flow. The computed rate of flow can be displayed, for example, by means of an indicating device 424 on the base body 414.

In a further generalization of the invention, it is alternatively possible to connect the sensor heads to a base body comprising the control and evaluation device merely by means of a wireless link. This provides even more degrees of freedom in positioning the sensor heads.

Basically, it is important in the present invention that the ultrasonic transceivers be disposed in the sensor heads 111, 112, 211, 212, 311, 312, 411, 412 so as to be parallel to the sensing or locating surface of the sensor heads 111, 112, 211, 212, 311, 312, 411, 412. Only by such means will the geometry of the measuring set-up not be affected by the sensor heads them-selves, but by the degree of inclination of the contact surfaces or contact devices relative to the center axis of the measuring tube 21, 22. Consequently, the geometry of the measuring set-up can be defined by the measuring tube 21, 22 alone. This offers the advantage that different measuring tubes 21, 22 can be used together with one and the same measuring device 11, 12, 13, 14. This make it possible to install measuring tubes 21, 22 in different devices and to operate these measuring tubes 21, 22 in connection with only one measuring device 11, 12, 13, 14.

Thus the invention provides a reasonably priced and user-friendly ultrasonic flow measuring system, in which a single measuring device can be used on many different permanently installed measuring tubes. In other words, provision is made, according to the invention, for the installation of defined measuring tubes at specific locations in fluid lines where it is of interest to measure the rate of flow temporarily. These measuring tubes for the ultrasonic flow measuring system of the invention can be produced at a very reasonable price as compared with measuring tubes having permanently installed ultrasonic sensors. Examples of possible fields of application include hydraulic pipes in hydraulic systems or water pipes.

Thus the ultrasonic flow measuring system of the invention comprising a measuring device and a measuring tube makes it possible to achieve high-precision measurements combined with ease of handling of the measuring system.

The invention claimed is:

1. A portable ultrasonic flow measuring system for use with a measuring device comprising two sensor heads that are movable relatively to each other, the portable ultrasonic flow measuring system comprising:
   a measuring tube comprising a straight tubular element having a tubular shell, and comprising tube-connecting elements at both ends,
   the measuring tube having
   two contact devices for the purpose of defining the contact position for one sensor head of the measuring device, respectively
   wherein said two contact devices define, for the measuring device, a direct signal path or a signal path including at least one reflection thereof against an internal wall of said measuring tube,
   an information carrier containing information concerning said measuring tube and/or said specified contact positions, and
   positioning aids defined by each of the contact devices for the purpose of forming a secure seating of said sensor heads on said contact devices, wherein the internal wall of the measuring tube comprises a constant diameter along a length of the signal path and the contact devices are formed on an outside of the tubular shell of the tubular element,
   wherein the contact devices each comprise a substantially plane surface on said tubular shell of the measuring tube, and
   said plane surfaces are each inclined in relation to a center axis of said measuring tube, wherein the signal path comprises an I-shape, V-shaped, N-shaped, or W-shaped signal path defined for an ultrasonic signal by said two plane surfaces of said two contact devices.

2. The measuring tube as defined in claim 1, characterized in that
said information carrier is in the form of an RFID tag or an electronic memory module and said information carrier comprises information concerning the material of said tube, the position of said contact devices in relation to each other, the angle of said contact devices in relation to a center axis of said measuring tube, the temperature of said measuring tube, the serial number of said measuring tube, and/or the specified signal path.

3. The measuring tube as defined in claim 1, characterized in that
said positioning aids are provided in the region of said contact devices for the purpose of forming a secure seating of said sensor heads on said contact devices, for forming a temporary force and/or tight-fit connection.

4. The measuring tube as defined in claim 1, characterized in that
coupling elements are provided in the region of said contact device, which ensure satisfactory coupling of ultrasonic signals into and out of said measuring tube.

5. The measuring tube as defined in claim 1, wherein the signal path includes at least one reflection against the internal wall of the measuring tube.

6. The measuring tube as defined in claim 5, wherein the signal path comprises a V-shape.

7. A portable ultrasonic flow measuring system comprising:
a measuring device for the portable ultrasonic flow measuring system, the measuring device comprising
two sensor heads,
wherein each sensor head comprises a sensor housing having a sensing surface formed thereon, which is intended to be placed on or against the exterior of a measuring tube,
wherein an ultrasonic transceiver for transmitting and receiving ultrasonic waves via the sensing surface is provided in each sensor housing, and
the measuring device comprising a control and evaluation unit for carrying out a measurement of a transit time difference for ascertaining the velocity of flow of a medium flowing through said measuring tube,
said ultrasonic transceivers are, under operating conditions, aligned to each other such that they form a direct signal path or a signal path including at least one reflection thereof against an internal wall of said measuring tube, and each ultrasonic transceiver in the sensor head is disposed in said sensor housing substantially parallel to said sensing surface, and said measuring tube for the portable ultrasonic flow measuring system for use with the measuring device, comprising
a straight tubular element having a tubular shell, and
comprising tube-connecting elements at both ends,
two contact devices for the purpose of defining the contact position for one sensor head of the measuring device, respectively
wherein said two contact devices define, for the measuring device, a direct signal path or a signal path including at least one reflection thereof against an internal wall of said measuring tube,
an information carrier containing information concerning said measuring tube and/or said specified contact positions, and
positioning aids defined by each of the contact devices for the purpose of forming a secure seating of said sensor heads on said contact devices, wherein the internal wall of the measuring tube comprises a constant diameter along a length of the signal path,
wherein contact devices are formed on an outside of the tubular shell of the measuring tube,
wherein the contact devices each comprise a substantially plane surface on said tubular shell of the measuring tube, and
said plane surfaces are each inclined in relation to a center axis of said measuring tube,
wherein the signal path comprises an I-shape, V-shaped, N-shaped, or W-shaped signal path defined for an ultrasonic signal by said two plane surfaces of said two contact devices.

8. The measuring device as defined in claim 7, characterized in that
said sensor heads are configured so as to be movable relatively to each other.

9. The measuring device as defined in claim 7, characterized in that
the measuring device comprises a base body and
the sensor heads are flexibly attached thereto.

10. The measuring device as defined in claim 9, characterized in that
the base body has a scissor shape, forceps shape, clamp shape, or vise-shape,
and the sensor heads are positioned at end regions of the base body.

11. The measuring device as defined in claim 9, characterized in that
said sensor heads are pivotally mounted on said base body.

12. The measuring device as defined in claim 9, characterized in that
the distance of said sensor heads from each other is variable and
said base body comprises means for ascertaining said distance.

13. The measuring device as defined in claim 9, characterized in that
said base body comprises a locking element for ascertaining the distance of said sensor heads from each other.

14. The measuring device as defined in claim 7, characterized in that
the measuring device comprising a readout device for automatically or semi-automatically reading the information carrier attached to the measuring tube, and
the control and evaluation unit implements at least some of the read out information for the purpose of ascertaining the velocity of flow of the medium flowing through said measuring tube.

15. The measuring device as defined in claim 7, characterized in that
said sensing surfaces are shaped so as to complement the positioning aids formed on the measuring tube and together therewith ensure secure seating of said sensor heads.

16. The measuring device as defined in claim 7, wherein the signal path includes at least one reflection against the internal wall.

17. The measuring device as defined in claim 7, wherein the signal path comprises a V-shape.

* * * * *

UNITED STATES PATENT AND TRADEMARK OFFICE
CERTIFICATE OF CORRECTION

PATENT NO. : 9,188,468 B2
APPLICATION NO. : 13/611407
DATED : November 17, 2015
INVENTOR(S) : Eric Rath et al.

It is certified that error appears in the above-identified patent and that said Letters Patent is hereby corrected as shown below:

On The Title Page, Item (73), change "Assignee: Hydeosonic B.V., Veghel (NL)" to "Assignee: Hydrosonic B.V., Veghel (NL)"

Signed and Sealed this
Fifteenth Day of March, 2016

Michelle K. Lee
*Director of the United States Patent and Trademark Office*